(12) United States Patent
Taffet

(10) Patent No.: US 7,355,724 B2
(45) Date of Patent: Apr. 8, 2008

(54) THREE-DIMENSIONAL MEASUREMENT SYSTEM

(75) Inventor: Bruno Taffet, Toulouse (FR)

(73) Assignee: Airbus France, Toulouse (FR)

( * ) Notice: Subject to any disclaimer, the term of this patent is extended or adjusted under 35 U.S.C. 154(b) by 386 days.

(21) Appl. No.: 11/088,942

(22) Filed: Mar. 25, 2005

(65) Prior Publication Data

US 2005/0270545 A1    Dec. 8, 2005

(30) Foreign Application Priority Data

Apr. 20, 2004    (FR) .................................. 04 04161

(51) Int. Cl.
*G01B 11/24*    (2006.01)
(52) U.S. Cl. ........................ 356/608; 356/601; 356/606
(58) Field of Classification Search .............. 356/3–22, 356/138–155, 601–624, 237.2–237.5; 250/234–236; 359/200–220
See application file for complete search history.

(56) References Cited

U.S. PATENT DOCUMENTS

| | | | | |
|---|---|---|---|---|
| 3,035,176 A | * | 5/1962 | Kis et al. ..................... 250/210 |
| 4,113,381 A | * | 9/1978 | Epstein ........................ 356/5.12 |
| 4,534,650 A | * | 8/1985 | Clerget et al. .............. 356/608 |
| 4,632,543 A | * | 12/1986 | Endo .......................... 356/5.08 |
| 5,150,169 A | * | 9/1992 | Van Wagoner .............. 356/614 |
| 5,361,217 A | * | 11/1994 | Makimura et al. .......... 702/152 |
| 5,582,518 A | * | 12/1996 | Henique et al. .............. 434/44 |
| 6,046,800 A | * | 4/2000 | Ohtomo et al. .......... 356/141.1 |
| 6,324,024 B1 | * | 11/2001 | Shirai et al. ................ 359/884 |
| 6,335,789 B1 | * | 1/2002 | Kikuchi ................... 356/141.1 |
| 6,473,716 B1 | * | 10/2002 | Ohishi et al. ............... 702/152 |
| 6,590,640 B1 |   | 7/2003 | Aiken et al. |
| 6,734,952 B2 | * | 5/2004 | Benz et al. ................. 356/5.01 |
| 2003/0222976 A1 | * | 12/2003 | Duran ........................ 348/43 |

FOREIGN PATENT DOCUMENTS

| | | |
|---|---|---|
| DE | 196 10 756 A1 | 9/1997 |
| EP | 0 358 559 A1 | 3/1990 |
| WO | WO 99/60335 | 11/1999 |

* cited by examiner

*Primary Examiner*—Layla G. Lauchman
*Assistant Examiner*—Jarreas Underwood
(74) *Attorney, Agent, or Firm*—Oblon, Spivak, McClelland, Maier & Neustadt, P.C.

(57) ABSTRACT

The invention relates to a three-dimensional measurement system comprising a hardware part and a software part, in which the hardware part includes a mobile two-axis assembly (12) associated with a remote measurement device (13) installed on a fixed part (14), each axis being equipped with an angular encoder (22) restoring the direction of a sighting at any time, and in which the software part includes a control part at the input and an acquisition part at the output.

12 Claims, 2 Drawing Sheets

THREE-DIMENSIONAL MEASUREMENT SYSTEM

TECHNICAL DOMAIN

The invention relates to a three-dimensional measurement system that can be used particularly for validation of an aircraft cockpit on the ground.

STATE OF PRIOR ART

During the design of cockpit mockups and simulator structures starting from CAD (Computer Aided Design) definitions, inconsistencies can arise during the development causing difficulties in integrating elements together, for example:

- The cockpit may be made according to CAD definitions made at different times. Inconsistencies then arise due to changes of these definitions. Every time that a new CAD definition is received, the question arises: how can the new layout structure thus defined be integrated into the existing "cockpit skeleton?"
- Once cockpits have been made and the equipment has been integrated, ergonomy problems can arise. Equipment may appear less accessible than was expected in the corresponding digital mockup layout. How can the cockpit made be validated against source digital definitions?
- If tests show that a cockpit zone creates access and/or ergonomy problems, how can this zone be measured/photographed/scanned precisely, before understanding how to re-work it digitally?
- 3D ("three-dimensional") scanning means available on the market are limited. Measurements of a few points can be made manually and they can be compared manually with other points on the digital mockup. But these means do not enable reconstitution of surfaces defined by thousands of measurement points, for which reliability is assured by a fine aiming mechanism.

The purpose of the invention is to solve these problems by proposing a controllable three-dimensional measurement system that can be modified by adding or by modifying control algorithms and can be coupled with CAD software based on existing industrial or R&D (Research and Development) technologies, for reconstitution of a real surface, particularly for validation of aircraft cockpits.

PRESENTATION OF THE INVENTION

The invention relates to a three-dimensional measurement system for reconstitution of a real surface, comprising a hardware part including a mobile two-axis assembly associated with a remote measurement device installed on a fixed part, each axis being equipped with an angular encoder restoring the direction of a sighting at any time, and a software part including a control part at the input and an acquisition part at the output, characterized in that the software part includes means of real time comparison of the two angular positions measured at a scanning profile set value.

In one advantageous embodiment, the two-axis assembly is in the shape of an "L". In this two-axis assembly, rotation about each axis is achieved by four modules:
- bearings, assuring guidance between a first and a second part,
- a motor for rotation of the first part with respect to the second part,
- an angular encoder for restoring the position about this axis to the software part,
- a cable passage module.

Advantageously, the fixed part is a tripod.

The invention also relates to a process for implementation of a system in an aircraft cockpit, including steps to:
- position the hardware part of the system at the center of the cockpit,
- calibrate the position of the system, by aiming at a known point in the cockpit,
- make this measurement point correspond to a corresponding CAD (Computer Aided Design) point,
- position and calibrate by positioning this hardware part at different positions in the cockpit.

The hardware part of the system can be positioned on the walls or ceiling of the cockpit by a suction cup device.

In particular, the system according to the invention can solve the following problems:
- create a three-dimensional reconstitution starting from a fixed point, therefore three measurement coordinates per point being necessary, by measuring the azimuth at each measurement point with respect to a reference point, and its elevation above this reference point and its distance,
- obtain good precision of the measurement; the measurement precision required can vary significantly, depending on the application concerned (for example reconstitution of a cockpit, reconstitution of a button, reconstitution of a building) and the distance between the reference point and the measurement zone (that can vary from a few tens of centimeters to several tens of meters, to satisfy dimensional or required field of vision requirements),
- make a CAD comparison: the use of the measurements in the CAD environment, having enabled physical production of a part, can be used to validate it. Conversely, this system may be used to create a CAD definition from a real part given for correction, a change to the part and creation of a new part.

The controlled two-axis aiming system according to the invention provides a means of scanning a surface or a set of non-plane surfaces with complex shapes at +/−180° along the two axes, azimuth and elevation. Three measurements are sufficient for three-dimensional reconstitution: azimuth, elevation and distance. Computer control of such a system enables the user to make the following measurement settings: choice of the angular measurement window, choice of the number of points, creation of an IGES (<<.igs>>) file that can be imported into any CAD software.

The quality of mechanical elements used in the system according to the invention makes it possible to vary:
- the aiming precision and therefore the measurement precision (quality of bearings, characteristics of stepping motors),
- the measurement range: an "L" configuration with two motor+bearing+cable assemblies enables measurements along each axis at +/−180°. In other words any direction may be aimed at in space.

Controllability is an important characteristic of this system. The following parameters can be varied by a man-machine interface:
- physical measurement zone: for example, a three-dimensional image of the cockpit can be reconstituted, by judiciously choosing the number of measurement points to find a good compromise between measurement time and good resolution, choice of the scanning type: horizontal, vertical, random or intelligent scanning, using more measurement points in high gradient zones (few points if the zone is relatively flat, more points when relief is accentuated)

choice of the speed: this parameter is related to the choice of scanning, choice of the controller for making a scanning profile controlled by the user: for example a PID (Proportional Integral Derivative) controller or another more complex controller that may be more suitable for the scanning profile and its velocity, use of mechanical fault compensation algorithms to further improve aiming precision (bearing friction compensation algorithms, or motor harmonic compensation algorithms such as Cogging torque or Ripple torque): this type of algorithm is applied to controllers on mechanisms using high technology components for achieving angular aiming precisions of the order of $10^{-6}$ radians, which can be very useful not only to further improve the definition of a surface measurement, but also to maintain the same precision when measuring from further away.

DETAILED PRESENTATION OF PARTICULAR EMBODIMENTS

Figure 1:
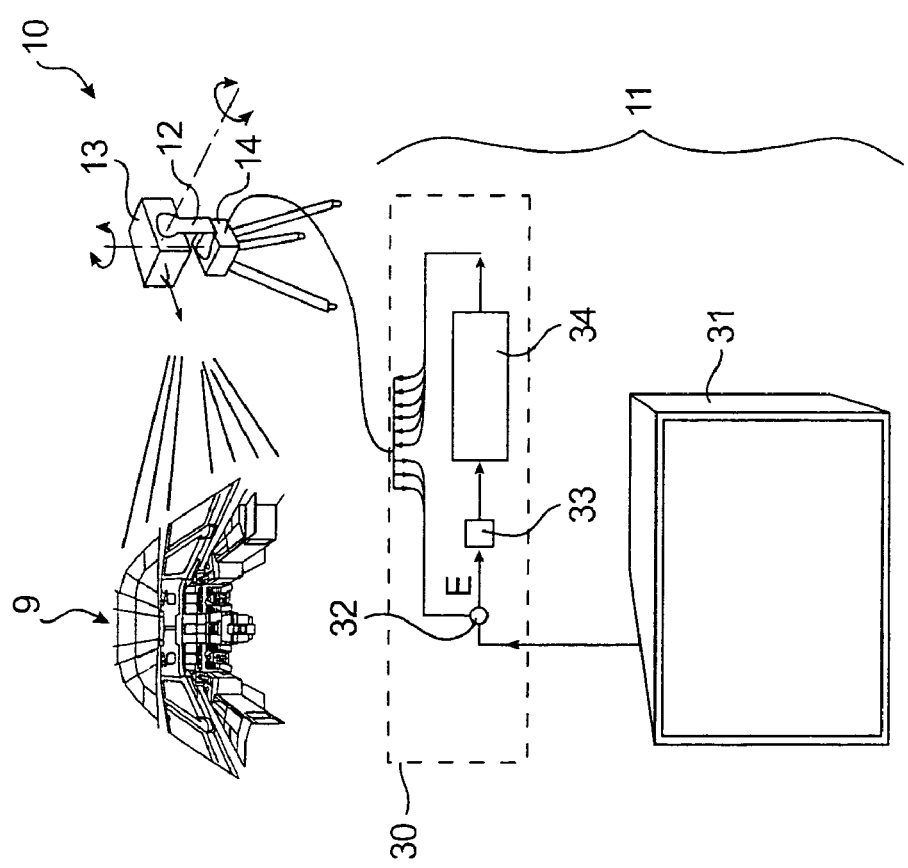
FIG. 1 illustrates the general architecture of the system according to the invention.

As illustrated in FIG. 1, the measurement system according to the invention includes a hardware part 10 and a software part 11.

The measurement zone 9 considered here is the cockpit of an aircraft on the ground.

The hardware part 10 includes a two-axis mobile wide-angle azimuth/elevation assembly 12 associated with a distance measurement device 13 mounted on a fixed part 14, for example a tripod.

In this mobile assembly 12, each axis is equipped with an angular encoder 22, for example optical, restoring the direction of a sighting at any time. The distance measurement device 13 may for example be a laser device.

The mobile assembly 12 may advantageously be in the shape of a "L" as illustrated in FIG. 1, which enables large angular movements about the two axes (practically +/−180° about each axis, the stop being defined by the clearance left by the cable passage).

Figure 2:
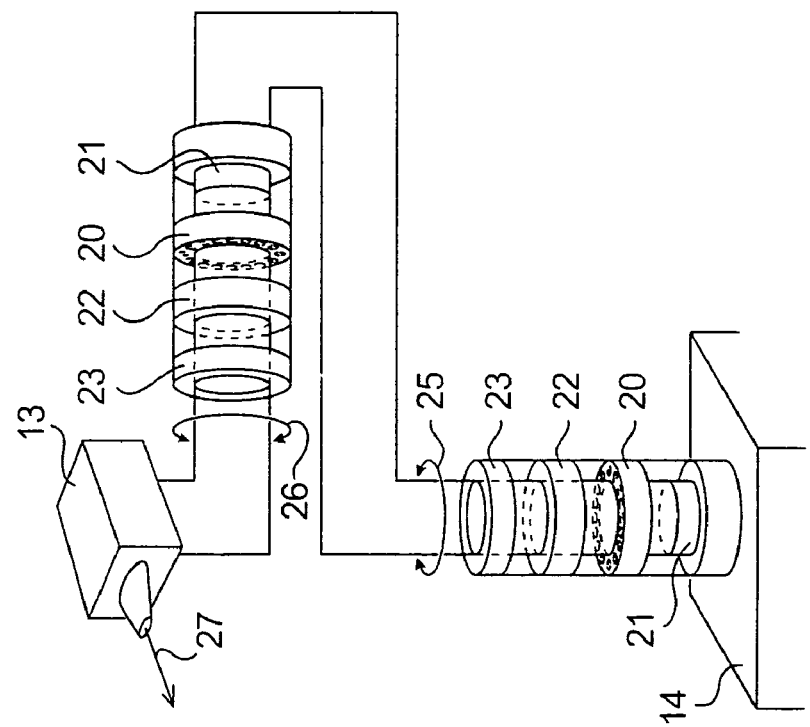
FIG. 2 illustrates a two-axis mechanism with a distance measurement device according to the invention.

As illustrated in FIG. 2, this two-axis assembly 12 is rotated about each axis by four modules:

bearings 20 for guidance between a first and a second part; firstly between the fixed part 14 and the said two-axis assembly 12 and secondly between the said assembly 12 and the distance measurement device 13, a motor 21, for example a stepping motor, enabling rotation of the first part about the second part, an angular encoder 22 for restoring the position around this axis to the software part, a cable passage module 23 which enables large movements, by winding.

This FIG. 2 also shows:
the azimuth rotation 25,
the elevation rotation 26,
the line of sight 27 of the distance measurement device 13.

As illustrated in FIG. 1, the software part 11 comprises a control module 30 and a man-machine interface (MMI) 31.

The control module 30 comprises:

a comparator 32 that receives firstly the real azimuth and elevation angles, and secondly real time set azimuth and elevation angles derived from the interface 31, and which outputs an error signal E, a controller 33, for example a PID controller that receives this error signal E and that outputs a torque, a control model 34 for the motor 21 that outputs the motor phases command.

The man-machine interface 31:
enables a choice of measurement parameters:
tracking window,
number of points,
data record format,
scanning speed,
enables post-processing:
comparison with theoretical data (CAD),
comparison with other measurements,
final modifications
merging with other measurements.

The software part 11 is broken down into two parts: an input control part and an output acquisition part.

For the control part, the choice or development of control software can make the system according to the invention very flexible and give it very high performance. Thus, the dSpace® workshop under Matlab®/Simulink® could be used, that offers an infinite number of possibilities of controlling the system. Thus, the following control procedure could be used:

the interface 31 asks the user to calibrate the position of the system, the user gives specific parameters for the measurement:

1) the measurement angle; for example azimuth between −67° and −45°; elevation between 18° and +9. If the user does not know the precise limits of the zone that he wants to measure, these limits can be measured by manually displacing the hardware part 10, and checking with the distance measurement device 13. Four measurement points are sufficient to define the limits of this zone, 2) requested precision: the user gives the maximum precision between each point, for example 1 millimeter. The controller 33 automatically makes an adaptation to obtain this precision; it is possible to choose this controller (Proportional Inverse Derivative (PID) or another), to choose or not to choose compensation algorithms, and to choose the scanning speed and the scanning principle (from left to right or top to bottom or other), 3) save format: CATIA® compatible IGEF or other . . .

For the acquisition part, the three parameters restored at each measurement point (the two angles of the optical encoders and the distance from distance measurement devices) are stored in a chosen format, for example IGEF. Saved 3D data may be directly superposed with the original data to which they have to correspond, under CATIA®.

This manner of proceeding enables validation of a manufactured part and validation of the part in a cockpit.

One example embodiment of the system according to the invention includes the following preliminary steps:

Positioning of the system according to the invention in the cockpit; typically, the system is placed in the middle of the cockpit or behind the third man seat, which makes it possible to aim at almost any zone in the cockpit. But if it is required to measure a small zone, the tripod 14 can be displaced, its height can be adapted, and the system can be brought closer to the measurement zone to obtain sufficient precision. A different position may be useful to measure surfaces hidden by other surfaces. For example, if it is required to measure the central part of the instrument panel and the power levers are in the way.

Calibration: the position of the system is calibrated by aiming at a perfectly known point in the cockpit, for example such as one of the three sighting balls for the pilot eye position. Three parameters are thus measured as a function of the position of the tripod and the position of the measurement mechanism on the tripod: Azimuth (in degrees), Elevation (in degrees) and distance (in mm). Finally, due to the acquisition software, this measurement point is made to correspond with the CAD point corresponding to the object aimed at.

The position and calibration may be restarted by positioning the hardware part 10 anywhere in the cockpit so that hidden surfaces can be measured, like those for example hidden by seats.

It is also possible to position the two-axis mechanism assembly associated with the measurement device on the sidewalls or the ceiling by a suction cup device so as to access hidden zones, or to more precisely measure horizontal zones, such as the plate of the pedestal on which various equipment or the side benches are located.

The system according to the invention has the following advantages:

It enables reconstitution of a CAD definition of an aircraft cockpit from a real cockpit, unlike what is usually done, or to obtain a physical assembly starting from a CAD definition. This reconstitution is made in the IGEF format. This reconstitution under CATIA® can then be superposed on the original CAD definition. This method can improve validation of cockpit mockups or flight simulators.

It enables the user all freedom when making a measurement: choice of the physical measurement zone (position, size), choice of the measurement precision, by choosing the algorithm or the number of measurement points per unit zone.

It uses a modular control software so that the system fault control or check algorithms can be changed, as a function of the application and the required precision.

We will now consider an example embodiment of the hardware part and the software part of the system according to the invention in more detail.

Hardware Part

The two-axis mobile assembly 12 associated with a distance measurement device 13 is mounted on a tripod 14, which enables a good seating for it, and good adjustment and good stability.

This tripod 14 performs the following functions:
Independent adjustment of the length of each stand
Level bubbles on the side for adjusting the azimuth zero.

The two-axis aiming mechanism 12 is positioned on this tripod after being adjusted, as illustrated in FIG. 2.

The two-axis mobile assembly 12 is a mechanism in the shape of an L, comprising an identical assembly at each end of the leg of the L enabling rotation about an axis. This assembly is composed of the following subassemblies:

bearings 20 for guidance according to a single degree of freedom in rotation, a brushless DC motor 21, or a two- or three-phase motor, the main characteristics being the speed and measurement precision during scanning of an zone, an optical angular encoder 22, with a number of bits corresponding to the number of engraved optical tracks directly giving the precision of the angular measurement. This measurement is essential for slaving the scanning profile chosen by the user, a mechanism for passage of a cable or cable strip 23, stored by a peripheral winding, and making the link between the interface 31 and the measurement device 13.

Figure 3:
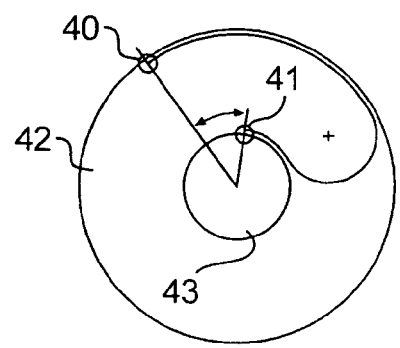
FIG. 3 illustrates the principle of the cable passage mechanism according to the invention.

The principle of the passage mechanism for the cable 23 in which the rotor carries the measurement device is illustrated in FIG. 3, which shows the attachments 40 and 41 onto the stator 42 and the rotor 43 respectively.

Therefore, for the aiming system, these two assemblies are made according to the same principle and using the same components. The distance measurement detector 13 is a module that is available on the market and that makes a laser measurement of the distance, and that can include a computer output enabling a transfer to a PC (Personal Computer) type terminal.

Software Part

The two hinges in the two-axis mobile assembly 12 are controlled by computer. The angular encoders 22 are used to precisely determine the two angular positions. These position measurements are compared in real time with the scanning profile set value controlled by the user. The control principle can be like that shown in FIG. 1 if the application does not require the use of complex algorithms for compensation of motor harmonics or bearing friction or other faults. A single PID controller 33 could be installed for each rotation axis.

The control loop is powered by the scanning profile controlled by the interface 31, installed on the same terminal.

The measured data may be saved by creation of an IGES (<<.igs>>) file that can be imported into any CAD software, including the CATIA® software that can be used for cockpit definitions.

Performances of such a System

The performances of the system according to the invention are closely related to the quality of the different mechanical elements:

Bearings 20: quality of ball machining, guide tracks, lubrication, etc.

Motors 21: Cogging torque, Ripple torque, number of steps, with brushes or brushless.

Angular encoders 22: the number of optical tracks in encoders directly gives the measurement precision essential for good slaving.

They are also directly related to the scanning speed.

Using existing technologies, the aiming precision at a scanning speed of 0.002°/s is estimated at 0.01°, and at a scanning speed of 0.01°/s it is estimated at 0.2°.

For a three-dimensional cockpit reconstitution application, the angular precision corresponding to 0.1 mm at a distance of 3 m is $2 \times 10^{-3}$ degrees. If the characteristics of the mechanical elements are such that this precision cannot be achieved, then algorithms well known to those skilled in the art can be used to compensate for the faults. These algorithms may include:
- friction compensation algorithms,
- motor harmonic compensation algorithms,
- algorithms for improving the scanning profile controller.

Aiming precisions of the order of $5 \times 10^{-5}$ degrees can be used in very fine aiming (very low scanning speed), depending on the number of algorithms used and their complexity. This order of magnitude is achieved by satellite aiming systems for inter-satellite communications.

The performances of the laser distance measurement device 13 are as follows, using manufacturer's data for portable laser meters on the market:
- measurement range: from 0.2 to 200 m,
- duration of a continuous measurement: from 0.16 to 1 s depending on the distance. This parameter has a large influence on the choice of the scanning speed as a function of the number of points chosen.

Figure 4:
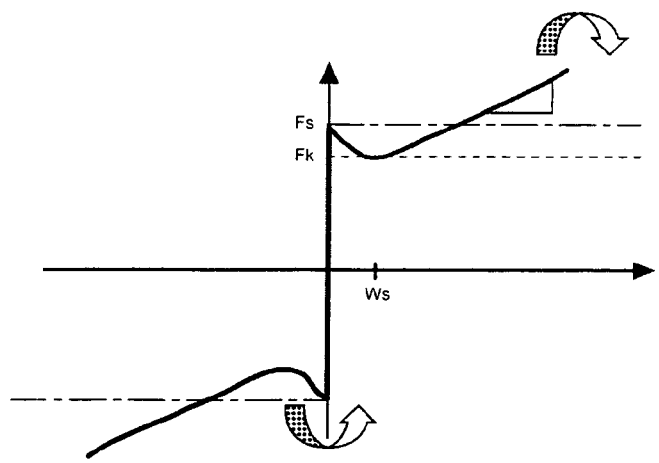
FIG. 4 illustrates the Lugre friction model.

Concerning compensation for friction, there are several techniques, some but not all based on knowledge of a model of friction to be compensated. FIG. 4 illustrates one possible model, namely the LUGRE model:

The various friction compensation algorithms are illustrated in the following table.

| Algorithms not based on knowledge of a model | PID<br>Variable Structure VSS<br>Adaptive impulse command (AM/FM) |
| --- | --- |
| Algorithms based on a friction model | Programming the gain<br>Fixed friction compensation (FF/FB)<br>Adaptative friction compensation (FF/FB) |

Concerning compensation of motor harmonics, the torque faults in which we are interested are angle harmonics. Therefore, we have a harmonic fault for which the frequency displaces with the speed. Their frequency is equal to their spatial frequency multiplied by the angular speed expressed in revolutions per second.

Figure 5:
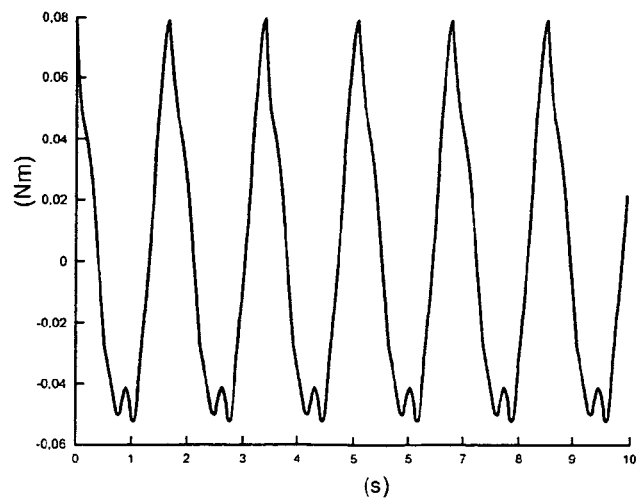
FIG. 5 illustrates Cogging and Ripple torques for 5% tracking.

As illustrated in FIG. 5 showing Cogging and Ripple torques during tracking at 5°/s, the main motor defects are harmonic rotor angle torques. Time harmonics are observed at constant angular speed.

Compensation by Kalman filter provides a means of obtaining further information about the motor faults rejection function, since a hole moves with the speed.

The disturbing torques to be compensated in this case are angle harmonics. They can be modeled by the following state equations:

$$\frac{dX}{d\theta} = \begin{bmatrix} 0 & 1 \\ -\omega^2 & 0 \end{bmatrix} X$$

the first component of the state represents the disturbing torque and the second its derivative with respect to the angle. The dimensionless spatial frequency $\omega$ is known since it is given as part of the manufacturer's data. Therefore the following observer can be constructed:

$$\begin{cases} \frac{d\hat{X}}{d\theta} = A\hat{X} + K(Y - C\hat{X}) \\ A = \begin{bmatrix} 0 & 1 \\ -\omega^2 & 0 \end{bmatrix} C = \begin{bmatrix} 1 & 0 \end{bmatrix} K = \begin{bmatrix} \alpha \\ \beta \end{bmatrix} \end{cases}$$

the filter thus composed is a narrow filter around the spatial frequency $\omega$.

Harmonic compensation by Kalman filter enables an increase in the gain with the speed. At 10°/s, this gain can be as high as a factor of 10.

The invention claimed is:

1. A three-dimensional measurement system for reconstitution of a real surface, comprising:
   a hardware part including a mobile two-axis assembly associated with a remote measurement device installed on a fixed part, each axis being equipped with an angular encoder restoring the direction of a sighting at any time, and
   a software part including a control part at the input and an acquisition part at the output, wherein the software part includes means for real time comparing two angular positions measured at a scanning profile set value, and wherein said software part further comprises means for superposing data obtained with said hardware part at said angular positions with an original CAD definition of a surface so as to obtain a reconstituted CAD definition of said surface;
   wherein said real surface is a surface of a real aircraft cockpit, and said original CAD definition is an original CAD definition of a surface of an aircraft cockpit such that said reconstituted CAD definition of the surface is a reconstitution of a CAD definition of an aircraft cockpit from a real cockpit.

2. A system according to claim 1, wherein the mobile two-axis assembly is in the shape of an <<L>>.

3. A system according to claim 2, wherein, in said mobile two-axis assembly, rotation about each axis is controlled by four modules:
   bearings assuring guidance between a first and a second part,
   a motor for rotation of the first part with respect to the second part,
   an angular encoder for restoring the position about this axis to the software part, and
   a cable passage module.

4. A system according to claim 1, wherein the remote measurement device is a laser device.

5. A system according to claim 1, wherein the fixed part is a tripod.

6. A process for implementation of a three-dimensional measurement system in an aircraft cockpit, said system comprising a hardware part including a mobile two-axis assembly associated with a remote measurement device installed on a fixed part, each axis being equipped with an angular encoder restoring the direction of a sighting at any time, and a software part including a control part at the input and an acquisition part at the output, wherein the software part includes means for real time comparing two angular positions measured at a scanning profile set value, said method including the steps of:
   positioning the hardware part of the system at the center of the aircraft cockpit, calculating the position of the system, by aiming at a known point in the cockpit to obtain a measurement point, making said measurement point correspond to a corresponding CAD point, positioning and calibrating by positioning this hardware part at different positions in the aircraft cockpit.

7. A process according to claim 6, wherein the hardware part of the system is positioned on the walls or ceiling of the cockpit by a suction cup device.

8. A process according to claim 6, wherein said mobile two-axis assembly is in the shape of an <<L>>.

9. A process according to claim 6, further comprising a step of controlling, in the mobile two-axis assembly, rotation about each axis.

10. A process according to claim 9, wherein said controlling is performed by four modules:

bearings assuring guidance between a first and a second part, a motor for rotation of the first part with respect to the second part, an angular encoder for restoring the position about this axis to the software part, and a cable passage module.

11. A process according to claim 6, wherein said the remote measurement device is a laser device.

12. A process according to claim 6, wherein said fixed part is a tripod.

* * * * *